March 16, 1943.　　　E. M. LEINO　　　2,314,049

SCARFING MACHINE

Filed Aug. 7, 1940

Inventor,
E. M. Leino
by: Glascock Downing & Seebold
Attys.

Patented Mar. 16, 1943

2,314,049

UNITED STATES PATENT OFFICE 2,314,049

SCARFING MACHINE

Eino Markus Leino, Helsingfors, Finland, assignor to O. Y. Wilh. Schauman A. B., Jyvaskyla, Finland, a joint-stock company of Finland Application August 7, 1940, Serial No. 351,657
In Germany January 21, 1939

3 Claims. (Cl. 143—42)

The present invention relates to apparatus for cutting sheet material and more particularly pertains to scarfing machines for beveling veneer slabs.

In bevelling ply-wood panels to provide scarf joints in order to join the ply-wood panels scarfing machines have been used in which the plywood panel is moved between two guide plates towards a rotating cutting blade. In the prior arrangements the cutting blade is inclined and spaced from the ends of the guide plates.

In cutting pliable veneer with uneven edges it is of the utmost importance that the space between the cutting edge of the cutting blade and the ends of the guide plates be as small as possible. It is also important that those parts of the end plates adjacent the rotary cutting blade coincide exactly with the curvature of the cutting blade. If the space between the ends of the guide plates and the cutting blade exceeds 1 millimeter a satisfactory bevelling of the veneer panel cannot be obtained particularly when the veneer panel is quite thin and flexible.

It has been found that the space between the ends of the guide plates and the cutting tool must not exceed 0.05 millimeter. It has been further found that when the cutting tool is sharpened by grinding or when the cutting tool is replaced the space between the ends of the guide plates and the circumference of the rotary cutting blade is often altered.

It is therefore an object of the present invention to provide a scarfing machine in which the space between the ends of the guide plates and the cutting edge of the rotary blade may be readily maintained to provide a sufficiently small gap to obtain a satisfactory bevelling of veneer slabs.

Other features and objects of the invention will be apparent from a consideration of the accompanying drawing and the following description wherein an exemplary embodiment of the invention is disclosed.

Figure 1:
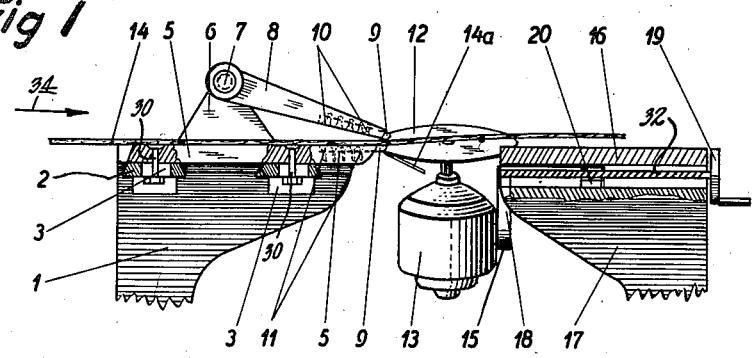
Fig. 1 is a side elevational view partly in section, of a machine embodying the invention.

Referring to the drawing there is shown at 1 a frame supporting a table 2. The table 2 is provided with oblong slots 3 as shown in Fig. 1. A guide plate 5 is arranged over the table 2 and secured thereto by means of bolts 30 extending through the guide plate 5 and the slots 3 in the table 2. In consequence of the oblong slots 3 the guide plate 5 can be moved to the right or left of the table 2 of Fig. 1. The guide plate 5 may be maintained in an adjusted position with respect to the table 2 by any suitable means such as by tightening the nuts on the bolts 30.

Figure 2:
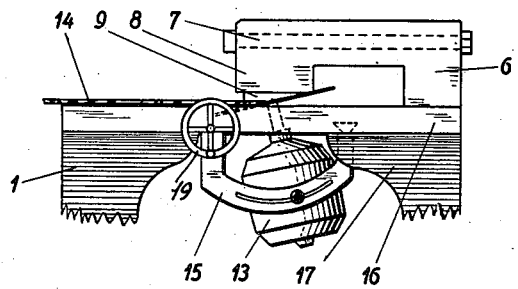
Fig. 2 is an end view of the machine shown in Fig. 1.

A bracket 6 is mounted on one side of the guide plate 5. The bracket 6 supports a transverse shaft 7 as shown in Figs. 1 and 2. An upper guide plate 8 is swingably mounted on the shaft 7 and in consequence of the gravity of the guide plate 8 it swings downwardly and rests with the free end thereof on the corresponding end of the lower guide plate 5 and these guide plates 5 and 8 are directed towards an inclined rotary cutting blade 12. The end portions of the guide plates are provided with end members 9 detachably mounted on the guide plates 5 and 8. The end members 9 extend somewhat beyond the edges of the guide plates 5 and 8 and thus form a mouth through which a ply-wood panel 14 may be fed towards the rotary blade 12. The end members 9 are, according to the invention, formed of stiff material which may be cut by the blade 12. Thus for example the end parts 9 may be formed of copper.

In assembling and adjusting the machine the guide plates 5 and 8 may be moved towards the rotary cutting blade 12 before the bolts 30 are tightened and the end members 9 are thereby cut by the blade 12 in exact accordance with the cutting part of the periphery of the blade 12. A correct space between the blade 12 and the ends of the guide plates is thereby automatically obtained and the step of moving the end members 9 of the guide plates into engagement with the rotary cutting blade may be renewed as soon as changes in consequence of wear appear in these parts of the machine. Thus the end members 9 of the guide plates are rather long at the beginning of operation of the machine and these end members may be secured to the guide plates 5 and 8 by means of screws 11 and 10 respectively. For this purpose each guide plate is provided with a number of threaded holes for adjusting the position of the end members 9 relatively to the guide plates.

This disc-shaped rotary cutting blade 12 may be driven by means of a motor 13 on the shaft of which the cutting blade is directly mounted. In order that it may be possible to change the angle of inclination of the rotary cutting blade the motor 13 is supported so that the motor and the blade 12 may be pivoted to alter the angle of inclination of the blade 12. In the embodiment illustrated the motor 13 is supported by an arcuate-shaped slide bar 15. The arcuate portion of the slide bar 15 forms the arc of a circle having its center in the middle of the cutting line of the blade 12. The slide bar 15 is supported on a table 16 arranged diametrically opposite the guide plates 5 and 8. The table 16 is supported by a frame part 17. In addition to the adjustment of the position of the guide plates 5 and 8 with respect to the cutting blade 12 by means of the bolts 30 and the oblong slots 3 additional means may be provided for displacing the tool 12 with respect to the ends of the guide plates. Such means may include a threaded shaft 32 for driving a nut 20. The nut 20 is attached to an arm 18 of the slide bar 15 so that the motor 13 and the cutting blade 12 may be moved towards or away from the ends of the guide plates by rotation of the handwheel 19.

Figure 3:
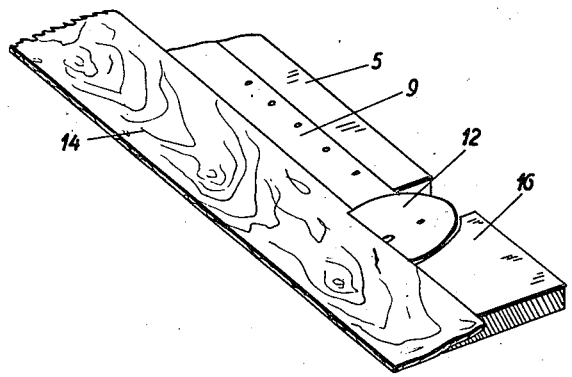
Fig. 3 is an enlarged perspective view of parts of the machine.

The end members 9 of the guide plates 5 and 8 are so arranged that the cutting part of the blade 12 will be as near as possible to the center line or diameter of the rotary cutting blade 12. In this way the cutting effect is generally directed at right angles to the feeding direction of the veneer panel. Thus when the panel 14 is moved in the direction of the arrow 34 in Fig. 1 an edge strip 14a will be severed by the blade 12. The severed edge 14a thus falls below the rotary cutting blade as shown in Fig. 1. In Fig. 3 the lower grade plate 5 is shown on a larger scale with its copper end members 9 terminating in a shape corresponding to the periphery of the rotary disc 12.

While the invention has been described with reference to a machine for providing bevelled edges on veneer or ply-wood panels it is to be understood that the apparatus is equally adapted for providing scarf joints for materials which are comparable to ply-wood panels. It is further apparent that changes may be made in the structural features of the apparatus. Such changes may be made without departing from the spirit and scope of the invention as set forth in the appended claims.

I claim:

1. In a machine for bevel cutting thin flexible veneer sheets, a rotatable disc-shaped cutting tool, frame means supporting said tool, a guide plate having an end portion cuttable by the tool arranged adjacent the periphery of said disc, a second guide plate pivotally mounted on the frame means and having an end portion cuttable by the tool forming a gap through which the veneer sheet may be moved towards the cutting tool, and means for moving the tool towards the end portions of said guide plates so as to cut the end portions thereof in conformity with the cutting portion of the tool.

2. In a machine for bevel cutting thin flexible veneer sheets, a frame, a guide plate on said frame, a disc-shaped rotatable cutting tool mounted on the frame inclined with respect to the upper surface of the guide plate, a second guide plate pivotally mounted above the first guide plate to form a mouth through which a veneer sheet may be fed diametrically of the cutting tool, end members carried by said guide plates formed of material adapted to be cut by said disc-shaped cutting tool, means for moving the periphery of the cutting tool into engagement with the end members of the guide plates so that the end members are shaped in conformity with the cutting tool.

3. In a machine for bevel cutting thin flexible veneer sheets, a frame, a guide plate slidable on said frame, a disc-shaped rotatable cutting tool mounted on the frame and inclined with respect to the upper surface of the guide plate, a second guide plate pivotally mounted on and above the first guide plate forming a mouth through which a veneer sheet may be moved diametrically of the cutting tool, end members carried by said guide plates formed of material readily cut by said cutting tool, whereby the end members of the guide plates may be moved into engagement with the cutting tool so that the end members are shaped in conformity with the cutting tool, and means for locking the first guide plate with the end members of both guide plates substantially in contact with the periphery of the cutting tool.

EINO MARKUS LEINO.